United States Patent
Balazinski et al.

(10) Patent No.: US 6,711,143 B1
(45) Date of Patent: Mar. 23, 2004

(54) SYSTEM AND METHOD IN A GPRS NETWORK FOR INTERFACING A BASE STATION SYSTEM WITH A SERVING GPRS SUPPORT NODE

(75) Inventors: Bartosz Balazinski, Montreal (CA); Yves Racine, Verdun (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 735 days.

(21) Appl. No.: 09/621,126

(22) Filed: Jul. 21, 2000

Related U.S. Application Data
(60) Provisional application No. 60/172,295, filed on Dec. 16, 1999.

(51) Int. Cl.[7] .................................................. H04Q 7/00
(52) U.S. Cl. ...................................... 370/329; 370/466
(58) Field of Search ............................. 370/310, 310.1, 370/310.2, 328, 321, 337, 347, 329, 465, 466, 467–69, 474, 476; 455/422, 556

(56) References Cited

U.S. PATENT DOCUMENTS

| | | | | |
|---|---|---|---|---|
| 6,167,040 A | * | 12/2000 | Haeggstrom | 370/352 |
| 6,320,873 B1 | * | 11/2001 | Nevo et al. | 370/466 |
| 6,487,595 B1 | * | 11/2002 | Turunen et al. | 709/226 |
| 6,505,047 B1 | * | 1/2003 | Palkisto | 455/456.1 |
| 6,608,832 B2 | * | 8/2003 | Forslow | 370/353 |

FOREIGN PATENT DOCUMENTS

| | | |
|---|---|---|
| WO | WO 97/16007 | 5/1997 |
| WO | WO 98/59468 | 12/1998 |
| WO | WO 99/33301 | 7/1999 |
| WO | WO 99/50974 | 10/1999 |
| WO | WO 99/56445 | 11/1999 |
| WO | WO 99/63774 | 12/1999 |
| WO | WO 00/19742 | 4/2000 |
| WO | WO 00/35153 | 6/2000 |
| WO | WO 00/76145 | 12/2000 |

* cited by examiner

*Primary Examiner*—David Vincent
(74) *Attorney, Agent, or Firm*—Smith & Danamraj, PC

(57) ABSTRACT

A system and method in a General Packet Radio Service (GPRS) network for interfacing a Base Station System (BSS) and a Serving GPRS Support Node (SGSN). A protocol stack in the BSS and the SGSN includes a User Datagram Protocol (UDP) layer over an Internet Protocol (IP) layer. Data packets are transmitted between functional entities in the SGSN and the BSS over a connectionless IP network. The protocol stack includes a Base Station System GPRS Protocol (BSSGP) protocol layer that provides radio-related, Quality-of-Service (QoS), and routing information that is required to transmit user data between the BSS and the SGSN. The stack also includes a modified Network Services (NS') layer which is divided into an upper NS'-Network Service Control (NS'-NSC) sub-layer and a lower NS'-Sub-Network Service (NS'-SNS) sub-layer. The NS'-NSC sub-layer maps to the BSSGP layer and manages fictional entities therein. The NS'-SNS sub-layer maps to the UDP and IP layers and provides access to the IP network. A single UDP port is reserved to make the NS layer and the BSSGP layer act as an application over the IP stack.

21 Claims, 5 Drawing Sheets

| Section | Description |
|---|---|
| 1 | IP Header (20 bytes) |
| 2 | UDP Header (8 bytes) |
| 3 | Network Service Entity Identifier (2 bytes) |
| 4 | BSSGP Virtual Connection Identifier (2 bytes) |
| 5 | Any of the NS' Message Payloads |

Fig. 4

SYSTEM AND METHOD IN A GPRS NETWORK FOR INTERFACING A BASE STATION SYSTEM WITH A SERVING GPRS SUPPORT NODE

PRIORITY STATEMENT UNDER 35 U.S.C. §119 (e) & 37 C.F.R. §1.78

This nonprovisional application claims priority based upon the prior U.S. provisional patent application entitled, "Gb Interface Issues", application No. 60/172,295, filed Dec. 16, 1999, in the names of Bartosz Balazinski, Yves Racine, Mahmood Hossain, Torsten Nilsson, and Lars Wilhelmsson.

CROSS-REFERENCE TO RELATED APPLICATIONS

This application discloses subject matter related to the subject matter disclosed in the co-assigned patent application, "System and Method for Automatically Configuring Network Service Entity Identifiers Utilizing a Gb-over-IP Interface in a GPRS Network" filed Jul. 21, 2000, Ser. No. 09/621,128, in the names of Mahmood Hossain, Yves Racine and Bartosz Balazinski.

BACKGROUND OF THE INVENTION

1. Technical Field of the Invention

This invention relates to telecommunication systems and, more particularly, to a system and method in a General Packet Radio Service (GPRS) network for interfacing a Base Station System (BSS) with a Serving GPRS Support Node (SGSN).

2. Description of Related Art

The Gb interface is an interface in the GPRS network between the SGSN and the BSS. Currently, the Gb interface sets up virtual circuits between the SGSN and the BSS based on the connection-oriented Frame Relay protocol. The protocol stack currently comprises an L1 physical layer (related to Frame Relay), a Network Service (NS) layer, and a Base Station System GPRS Protocol (BSSGP) layer. The NS layer is divided into two sub-layers. The upper NS sub-layer is called the Network Service Control (NSC), and is like the glue with the BSSGP layer above. The lower NS sub-layer is called Sub-Network Service (SNS), and is like the glue with the underlying Frame Relay structure. The structure and function of the existing layers is described in more detail below in connection with FIGS. 1 and 2.

It is desirable to replace existing interfaces in the GPRS network with connectionless Internet Protocol (IP)-based interfaces. Currently, for example, the interface between the SGSN and the Gateway GPRS Service Node (GGSN) is based on IP, and many of the network nodes operate internally on the IP protocol. Many advantages could be gained by converting the Gb interface to utilize IP also. A straightforward solution is to encapsulate the Frame Relay information in IP packets sent between the two nodes. However, this solution adversely impacts the performance of the Gb interface as described further below. Also, there are existing networks using the Gb interface over Frame Relay, and any new interface needs to be backward compatible to support these Frame Relay networks. Therefore, the new interface must have a protocol stack that supports both Frame Relay and IP. Thus, unlike other interfaces in the GPRS network, the Gb interface has not been converted to IP because there has not been a solution identified that supported both Frame Relay and IP while not adversely affecting the performance of the interface.

It would be advantageous to have a system and method for interfacing the BSS and the SGSN that is based on the IP protocol. Basing the interface on IP would provide additional flexibility and features that exist in IP but not in Frame Relay. There is also a larger pool of products available for IP than for Frame Relay, and the use of IP allows the use of several different layer 1 and layer 2 technologies (e.g., Frame Relay, Ethernet, fiber optics, etc.). In essence, the Gb interface would become carrier-independent and much more flexible in terms of routing. It would also be easier to maintain.

There are no known prior art teachings or suggestions of a method such as that described and claimed herein.

SUMMARY OF THE INVENTION

In one aspect, the present invention is a method in a General Packet Radio Service (GPRS) network of interfacing a Base Station System (BSS) and a Serving GPRS Support Node (SGSN). The method implements a protocol stack in the BSS and the SGSN that includes a User Datagram Protocol (UDP) layer over an Internet Protocol (IP) layer. Data packets are then transmitted between the BSS and the SGSN over a connectionless IP network. The data packets carry information between functional entities in the SGSN and functional entities in the BSS.

The protocol stack includes a Base Station System GPRS Protocol (BSSGP) protocol layer that provides radio-related, Quality-of-Service (QoS), and routing information that is required to transmit user data between the BSS and the SGSN. The stack also includes a modified Network Services (NS') layer which is divided into an upper NS'-Network Service Control (NS'-NSC) sub-layer and a lower NS'-Sub-Network Service (NS'-SNS) sub-layer. The NS'-NSC sub-layer maps to the BSSGP layer and manages functional entities therein. The NS'-SNS sub-layer maps to the UDP and IP layers and provides access to the IP network. A single UDP port is reserved to make the NS' layer and the BSSGP layer act as an application over the IP stack.

In another aspect, the present invention is an SGSN that interfaces with a BSS utilizing a Gb-over-IP interface. The SGSN includes a protocol stack that includes a UDP layer over an IP layer, and means for transmitting and receiving packet data units (PDUs) to and from the BSS over a connectionless IP network.

In yet another aspect, the present invention is a BSS that interfaces with an SGSN utilizing a Gb-over-IP interface. The BSS includes a protocol stack that includes a UDP layer over an IP layer, and means for transmitting and receiving PDUs to and from the SGSN over a connectionless IP network.

In still another aspect, the present invention is a system for interfacing an SGSN with a BSS utilizing a Gb-over-IP interface. The system comprises an SGSN and a BSS which are modified to utilize the Gb-over-IP interface. The SGSN includes a protocol stack that includes a UDP layer over an IP layer, and means for transmitting and receiving PDUs to and from the BSS over a connectionless IP network. The BSS includes a protocol stack that includes a UDP layer over an IP layer, and means for transmitting and receiving PDUs to and from the SGSN over the connectionless IP network.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 4 is a tabular representation of a Packet Data Unit (PDU) structured in accordance with the teachings of the present invention to operate on the Gb-over-IP interface.

DETAILED DESCRIPTION OF EMBODIMENTS

The present invention converts the Gb interface to IP while continuing to support Frame Relay and without adversely affecting the interface's performance. Instead of encapsulating Frame Relay information in IP packets, the invention modifies the lower NS sub-layer, and achieves much better performance as a result. The invention adapts what was there for Frame Relay to map to the User Datagram Protocol/Internet Protocol (UDP/IP) instead.

Figure 1:
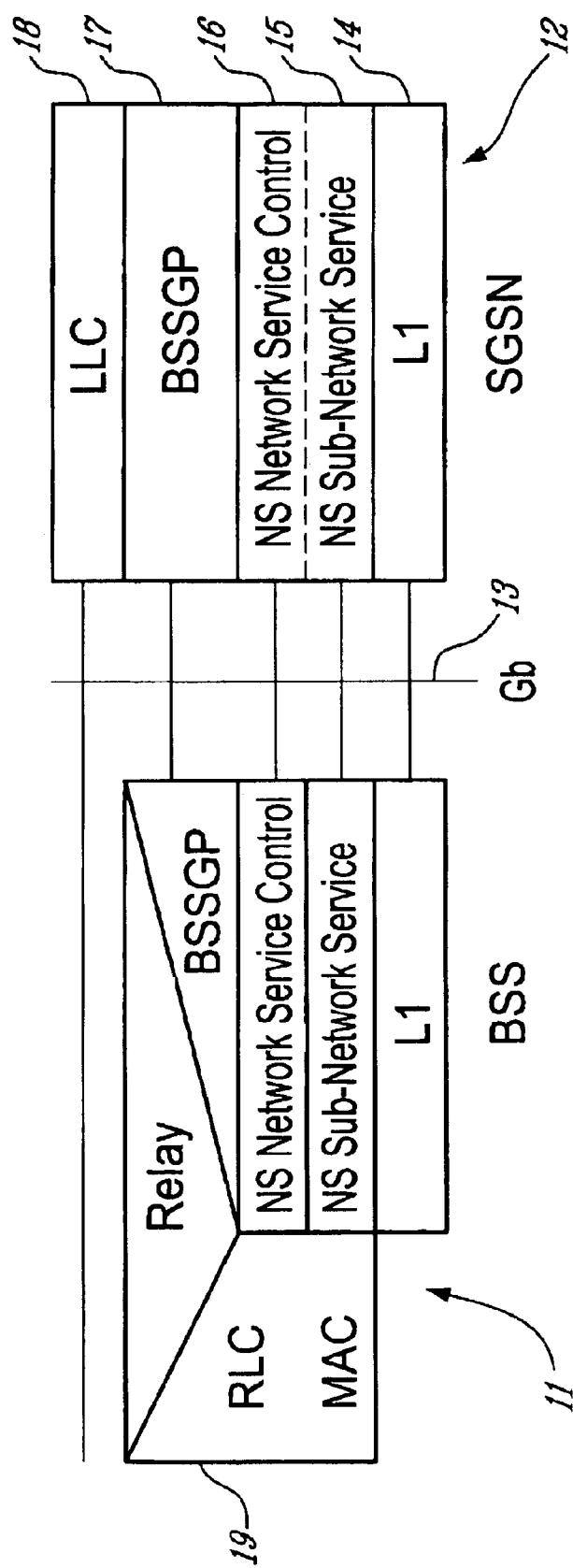
FIG. 1 (Prior Art) is an illustrative drawing of the protocol stacks in the Base Station System (BSS) and the Serving GPRS Support Node (SGSN) utilized in the existing Frame Relay-based Gb interface.

FIG. 1 is an illustrative drawing of the protocol stacks in the Base Station System (BSS) 11 and the Serving GPRS Support Node (SGSN) 12 utilized in the existing Frame Relay-based Gb interface 13. Each node utilizes a protocol stack comprising a physical (L1) layer 14, a Network Service (NS) layer that is divided into an NS-Sub-Network Service (NS-SNS) layer 15 and an NS-Network Service Control (NS-NSC) layer 16, and a Base Station System GPRS Protocol (BSSGP) layer 17. The SGSN also contains a Logical Link Control (LLC) layer 18 that the BSS does not contain. The BSS relays BSSGP information to a Radio Link Control/Medium Access Control (RLC/MAC) protocol block 19.

To understand the invention, the BSSGP layer 17 and the NS sub-layers 15 and 16 need to be understood. The primary function of the BSSGP layer is to provide the radio-related, Quality-of-Service (QoS), and routing information that is required to transmit user data between a BSS and an SGSN. In the BSS, the BSSGP layer acts as an interface between LLC frames and the RLC/MAC blocks 19. Thus, on the downlink (SGSN to BSS), the BSSGP layer supports the provision of radio related information used by the RLC/MAC function. The BSS has to extract the payload and control information and relay it toward the air interface and the RLC/MAC. In the SGSN, the BSSGP layer forms an interface between RLC/MAC-derived information and LLC frames. Thus on the uplink (BSS to SGSN), it supports the provision of radio related information derived from the RLC/MAC function. On both the downlink and the uplink, the BSSGP layer supports the provision of functionality to enable the two physically distinct nodes to operate node-management functions.

Figure 2:
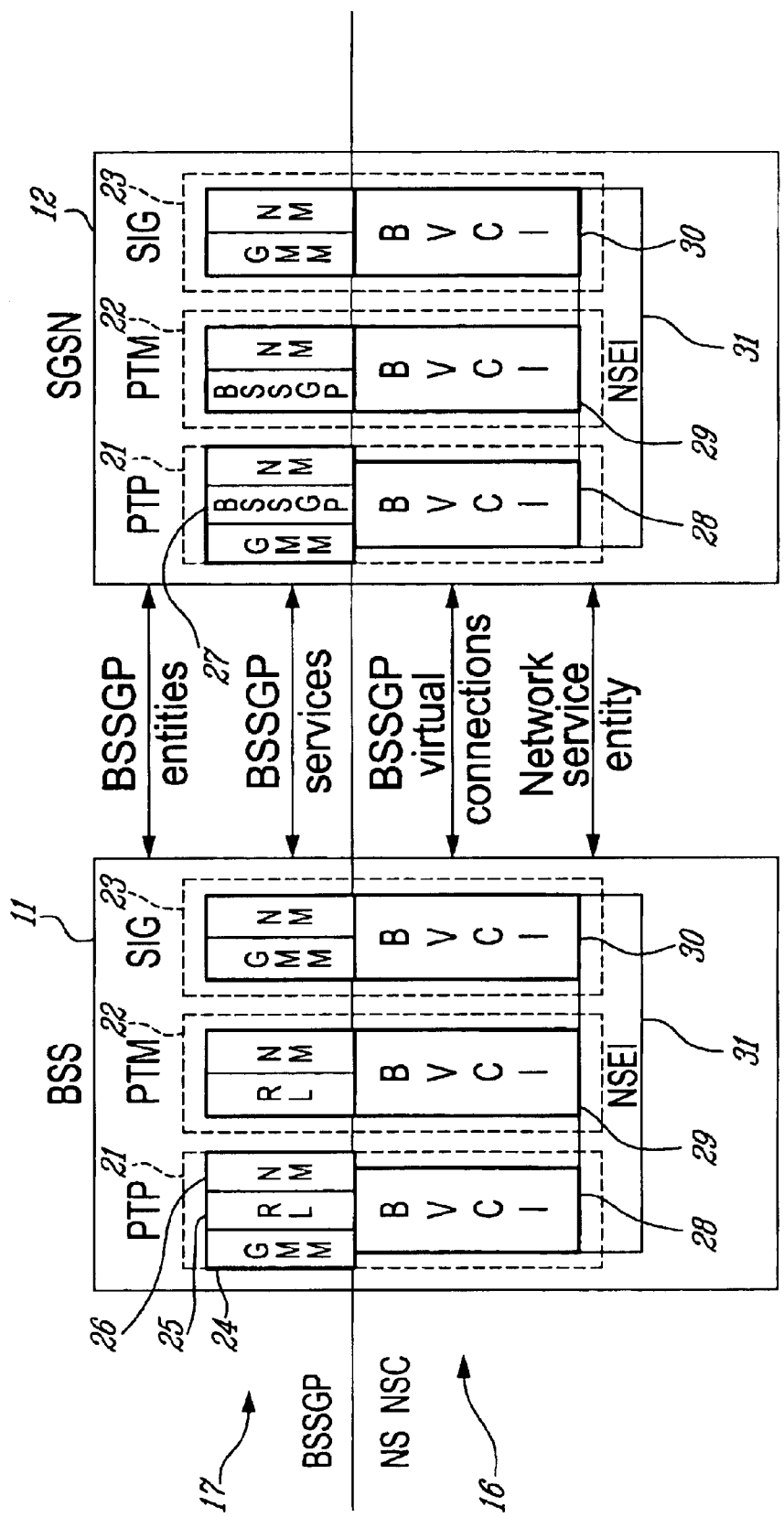
FIG. 2 (Prior Art) is a functional block diagram showing the relationship between the addressing, services, and functional entities in the BSS and the SGSN.

FIG. 2 is a functional block diagram showing the relationship between the addressing, services, and functional entities in the BSS 11 and the SGSN 12. The drawing illustrates the functional entities on the BSSGP layer 17 and the NS-NSC sub-layer 16. On the BSSGP layer, there are three functional entities in each node: Point-to-Point (PTP) functionality 21, Point-to-Multipoint (PTM) functionality 22, and signaling (SIG) functionality 23. PTP 21 can be characterized as communications, for example, from the SGSN to a particular cell. In the BSS, PTP involves three sub-functions: GPRS Mobility Management (GMM) 24, a Relay function (RL) 25 that transfers data to/from the RLC/MAC air interface, and Node Management (NM) 26. In the SGSN, PTP involves GMM, a BSSGP sub-function 27, and NM.

PTM 22 can be characterized as all of the broadcast messages. In the BSS, PTM has two sub-functions: RL and NM. In the SGSN, PTM involves the BSSGP sub-function and NM. The SIG functionality 23 relates to functions associated with the Gb interface itself, and node management. In both the BSS and the SGSN, SIG has two sub-functions: GMM and NM.

The existing NS layer adapts the BSS to the Frame Relay protocol (L1/L2). The main function of the NS layer is to provide transportation for BSSGP Virtual Circuits (BVCs) over a Frame Relay network. Frame relay has virtual circuits because it is a connection-oriented protocol. BVCs are the connections between peer functional entities on each side of the Gb interface, and each BVC is identified by a BVC Identifier (BVCI). Each of the BSSGP-level functional entities (PTP, PTM, and SIG) 21–23 has an associated BVCI 28–30. The interface between the BSSGP layer 17 and the NS-NSC sub-layer 16 is called a Network Service Entity (NSE). The NSE is identified by a NSE Identifier (NSEI) for each group of three types of BVCIs (at the NS layer) and the related PTP, PTM, and SIG functional entities (at the BSSGP layer). Note that while FIG. 2 illustrates only three BVCIs, in reality there is always one SIG BVC (always numbered 0), one PTM BVC (always numbered 1), and many PTP BVCs, each one related to a cell.

When data enters the BSS or SGSN, it has to reach the PTP, PTM, and SIG functional entities and their sub-functions. For example, when the SGSN wants to communicate between its PTP entity and the PTP entity in the BSS, it selects the appropriate BVCI in the appropriate NSE, builds the packet, and sends it through the lower Frame Relay network (not shown). Each BVC corresponds to certain NSEs which are like the physical frame relay virtual circuits.

The primary functions of the existing NS-NSC sub-layer 16 are:
(1) Transmission of NS Service Data Units (SDUs). NS SDUs are transmitted unacknowledged across the Gb interface (Packet Data Unit (PDU): NS-UNITDATA).
(2) Load sharing between different NS virtual circuits.
(3) NS virtual circuit management. The different NS virtual circuit management procedures are Blocking/Unblocking, Reset, and Test. They use the following NS PDUs: NS-BLOCK, NS-BLOCK-ACK, NS-UNBLOCK, NS-UNBLOCK-ACK, NS-RESET, NS-RESET-ACK, NS-ALIVE, and NS-ALIVE-ACK.

The primary functions of the existing NS-SNS sub-layer 15 are:
(1) Providing access to the Frame Relay network or the NSE peer identity by means of a Network Service-Virtual Link (NS-VL), a logical representation of the physical link. In the existing Gb over Frame Relay, the NS-VL is the local link of the Frame Relay Permanent Virtual Connection (PVC).
(2) Providing NS virtual circuits between peer NSEs.
(3) Transferring NS SDUs in sequence order on each NS virtual circuit unless order is not required.
(4) Indicating to the upper layer the availability/unavailability of an NS virtual circuit.

Figure 3:
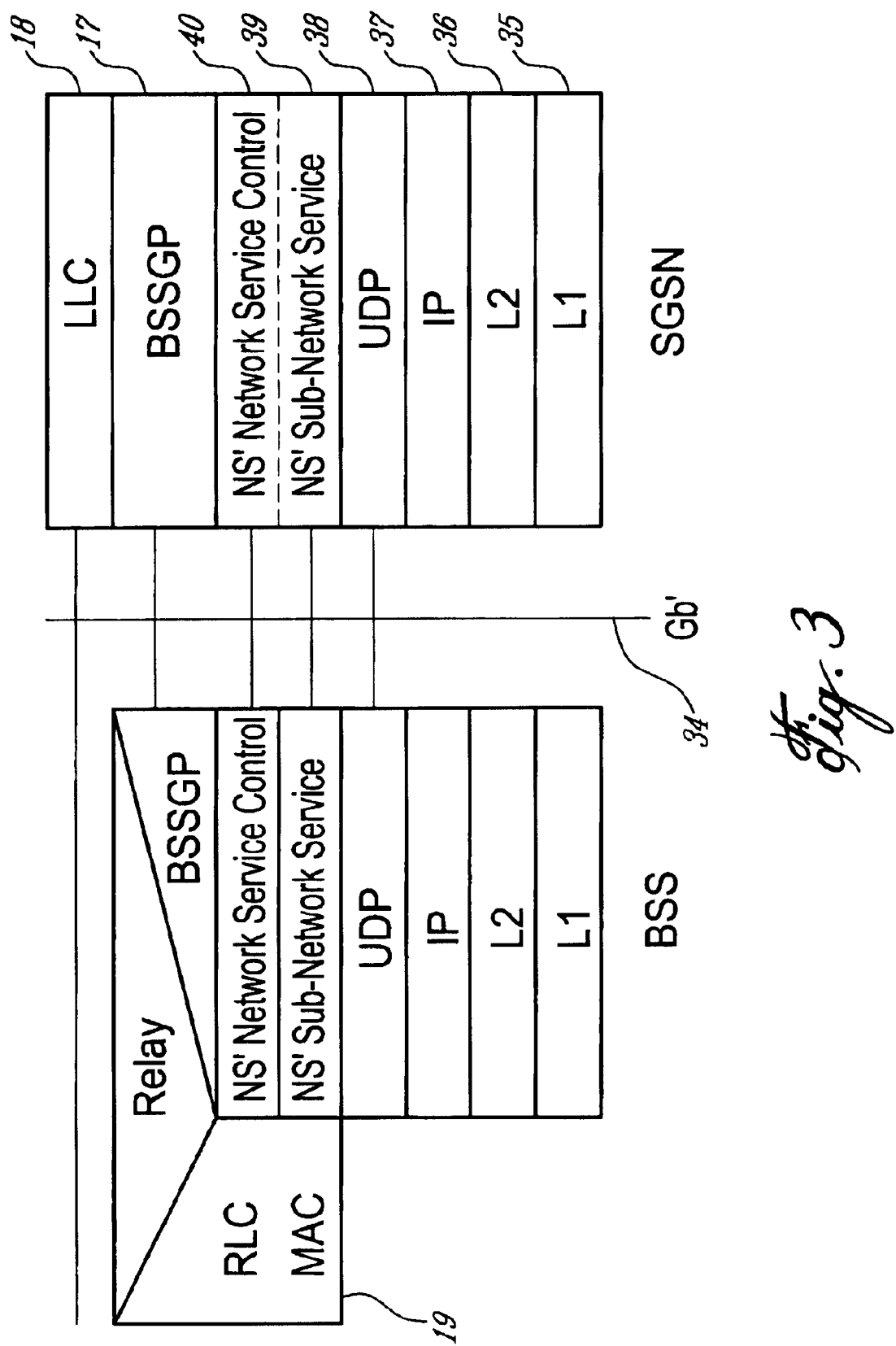
FIG. 3 is an illustrative drawing of the protocol stacks in the BSS and the SGSN utilized in the Internet Protocol (IP)-based Gb interface of the present invention.

FIG. 3 is an illustrative drawing of the protocol stacks in the BSS and the SGSN utilized in the Internet Protocol (IP)-based Gb' interface 34 of the present invention. Each node utilizes a protocol stack comprising a physical (L1) layer 35, a link (L2) layer 36, an Internet Protocol (IP) layer 37, a User Datagram Protocol (UDP) layer 38, a modified Network Service (NS') layer that is divided into an NS'-Sub-Network Service (NS'-SNS) layer 39 and an NS'-Network Service Control (NS'-NSC) layer 40, and the BSSGP layer 17 which is unchanged from the existing protocol stack. The LLC layer 18 in the SGSN is also unchanged from the existing protocol stack. As before, the BSS relays BSSGP information to the RLC/MAC protocol block 19.

The present invention transports the information from the SGSN functional entities to the BSS functional entities (and vice versa), and instead of using Frame Relay virtual circuits, uses IP packets following multiple routes between end points over a connectionless IP network. The invention does not modify the BSSGP layer 17 (or the connections between the BSSGP layer and the NS layer). This has tremendous advantages because it is not necessary to modify current implementations that run on Frame Relay. The NS layer, therefore remains, but is adapted to IP.

The general profile of the Gb' interface 34 is that the transport over the BSSGP layer is connectionless and without retransmissions. For these characteristics, UDP has been selected as the most suitable protocol. Thus, the modified Gb' interface uses a UDP layer 38 over an IP layer 37. BVCIs and NSEIs must be transported to be able to multiplex and de-multiplex UDP packets between the PTP, PTM, and SIG functional entities on the BSSGP layer. For this, one UDP port is reserved in order to make the modified NS layer and the BSSGP layer act as an application over the IP stack.

One potential approach for implementing the IP-based Gb' interface is to use UDP ports as BVCIs and NSEIs as IP addresses. However, the present invention uses a single UDP port rather than using the UDP ports as BVCIs and the NSEIs as IP addresses because that approach would cause many complications from the O&M perspective. If a UDP port is reserved for each BVC, it is extremely complicated to manage those UDP ports. IP is an open protocol, so there may be other applications running on the two platforms being interfaced. Each of those applications reserves its own UDP ports. Therefore, it becomes very difficult to find and use a UDP port that is not already being used. So instead, the invention carries the BVCI and NSEI over one single UDP port.

In the present invention, the existing NS-NSC sub-layer 16 and the existing NS-SNS sub-layer 15 are replaced by an NS'-NSC sub-layer 40 and an NS'-SNS sub-layer 39. The functions of the NS'-NSC sub-layer 40 are:

(1) Transmission of NS' SDUs which are carried by the NS layer. As with Frame Relay, NS' SDUs are transmitted in unacknowledged mode across the Gb interface by means of an NS'-UNIT DATA PDU.

(2) NSE management. The different NSE management procedures are Blocking/Unblocking, Reset, and Test. These procedures use the following NS' PDUs: NS'-BLOCK, NS'-BLOCK-ACK, NS'-UNBLOCK, NS'-UNBLOCK-ACK, NS'-RESET, NS'-RESET-ACK, NS'-ALIVE, and NS'-ALIVE-ACK. Thus, the NSE management function includes creation/deletion and blocking/unblocking of NSEs. With the current Frame Relay Gb interface, some packets may be exchanged between the BSS and the SGSN to manage the virtual circuits. For example, when a virtual circuit is created, it is put in a blocked state. Packets are then transferred to reset the circuit. The same approach is used in the present invention, but rather than being used on virtual circuits, the approach is used on NSEs. Therefore, instead of resetting a virtual circuit between the nodes, the interface resets the NSE at the other end.

(3) For a given BSSGP functional entity, the NS'-NSC sub-layer is responsible for making sure the packets are sent in the right order. In order for the protocol stack to be backward compatible with nodes still using Frame Relay, the NS' SDUs are transmitted in sequence order. Since Frame Relay uses virtual circuits, packets in Frame Relay are transferred in the same order they were sent. Therefore, the NS'-NSC sub-layer duplicates this functionality using IP. A methodology for packet resequencing is disclosed in co-pending and co-owned U.S. patent application Ser. No. 09/538,195, filed Mar. 30, 2000 and entitled, *Method of Preserving Data Packet Sequencing*, which is hereby incorporated herein in its entirety.

Resequencing may also be performed using the Real Time Transport (RTP) protocol although it utilizes greater overhead and longer headers. RTP provides end-to-end delivery services for data with real-time characteristics such as interactive audio and video. Those services include payload type identification, sequence numbering, timestamping, and delivery monitoring. The sequence numbers included in RTP allow the receiver to reconstruct the sender's packet.

The functions of the NS'-SNS sub-layer 39 are:

(1) Providing access to the IP network using a UDP port and an IP address.

(2) Multiplexing of NS' PDUs to the right NSE using the NSEI.

(3) Providing the ability to use Differentiated Services in order to give priority to one data stream over another.

(4) Indicating the availability/unavailability of the IP stack.

FIG. 4 is a tabular representation of a Packet Data Unit (PDU) structured in accordance with the teachings of the present invention to operate on the Gb-over-IP interface. All Gb packets contain sections 1–3 and 5. All packets that are transferred between two BSSGP layers on different nodes should also contain section 4.

Figure 5:
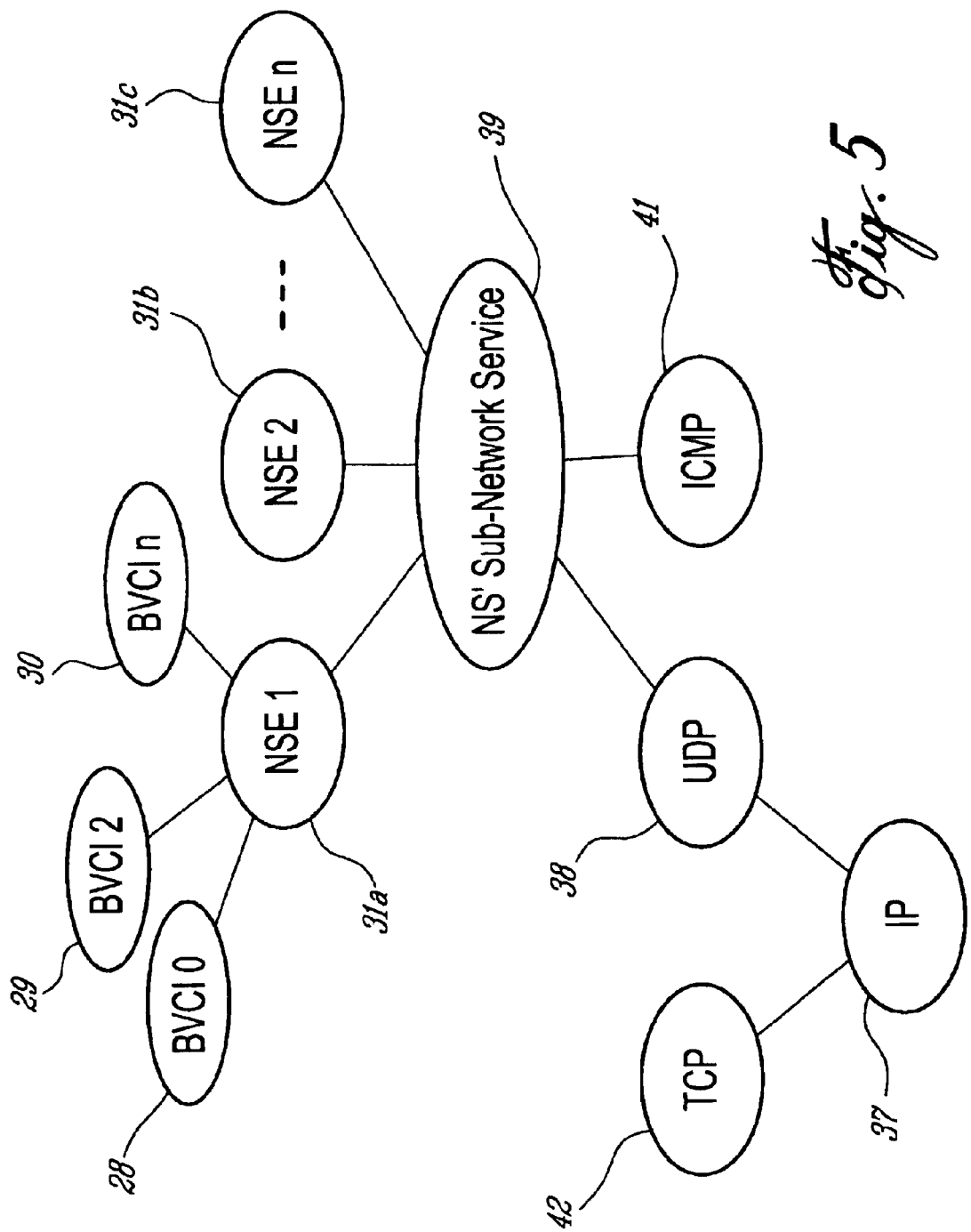
FIG. 5 is a simplified block diagram illustrating an implementation view of the Gb-over-IP interface of the present invention.

FIG. 5 is a simplified block diagram illustrating an implementation view of the IP-based Gb' interface of the present invention. The IP layer 37 and the UDP layer 38 provide the transport and routing capability previously performed by Frame Relay. Optionally, the UDP/IP layers can also perform the security function. The UDP/IP layers provide access to the entire bandwidth of the underlying physical layer. However, this bandwidth is shared over time between all of the applications using the same IP stack. The virtual circuit management function is no longer performed since virtual circuits are not used with IP. Instead, management of the IP stack is performed.

The Internet Control Message Protocol (ICMP) 41 is used by the NS' in order to notify the opposite side of the connection about various transmission errors at the IP level. For example, if the Gb application is not running, a Port Unreachable ICMP error is generated; if there is too much traffic on one side, a Source Squelch ICMP error is generated; etc. The Transmission Control Protocol (TCP) 42 is also illustrated as a transport layer protocol that can be utilized with IP, although it is not suitable for the Gb' interface due to its heavy overhead and retransmission characteristics. As noted above, the Gb interface provides an unconfirmed connectionless link between the SGSN and the BSS. This is because the higher protocol layers such as LLC 19 implement procedures for increasing the reliability when it is required. Thus, the robust characteristics of TCP, such as retransmission of missing packets, is not suitable for the Gb' interface.

As noted above, the NS'-SNS sub-layer 39 provides the "glue" to the UDP/IP stack below, and supports the NSEs 31a–31c in the SGSN and BSS above. Each NSE, in turn, is associated with a plurality of BVCIs 28–30. The BVCIs are associated with the PTP, PTM, and SIG functional entities at the BSSGP layer.

The NSEs 31a–31c provide the two services of NS' SDU Transfer and Status Indication to the BSSGP layer. Unlike Frame Relay, in IP, the Status Indication service does not perform congestion indication because support for the congestion indication (part of the ICMP) is not reliable. This is because congestion indication messages are not necessarily generated in IP when the congestion occurs. Therefore, status indication cannot be performed in Gb-over-IP as it is done in Gb-over-Frame Relay.

In order to de-couple the BSSGP layer from the UDP/IP layers, the BSSGP functional entities (PTP, PTM, and SIG) continue to be addressed using BVCIs and NSEIs. This allows the configuration and maintenance of the IP layer to be independent from the configuration of the BSSGP layer. The addressing is based upon the descriptions of the BSS and the SGSN in the standards. The BSS is sub-divided into the Base Station Controller (BSC) and the Base Transceiver Station (BTS). The Packet Control Unit (PCU), along with GPRS-specific pieces of hardware and software, can be implemented in any of these locations. The placement may vary from vendor to vendor, but each vendor's SGSN must be able to communicate with any other vendor's BSS, and vice versa. Thus, multiple NSEIs must be supported in each BSS and SGSN. On the BSS side, however, it is assumed that the PCU is the node where the Gb' interface is connected. Wherever a vendor places the PCU in the BSS, the SGSN must be able to address it.

In a first addressing alternative, both the PCU and the SGSN have single IP addresses. In the BSS, it is assumed that an NSEI has a one-to-one relationship with a PCU. The NSEI is not transported between the BSS and the SGSN; the SGSN keeps a relationship between NSEIs and IP addresses internally, and each PCU in the SGSN has an NSEI assigned. The Gb' interface is assigned a unique port number.

Since many PCUs are connected to one SGSN, the SGSN application receiving a packet on the Gb' port needs to extract the BVCI from the packet and extract the IP address in order to route the packet to the right BSSGP functional entity. This alternative offers several advantages: (1) it is simple to configure since it only requires setting the IP addresses (the port number is known); (2) NSEIs and BVCIs are assigned as they were with Frame Relay; (3) since only one port number is used, there is no possible conflict with other applications; and (4) the BSSGP layer is not modified; only the SNS sub-layer of the NS' layer is modified. However, it is impossible for a single PCU to host multiple NSEIs because each PCU has a single IP address. Additionally, NSEI management is tied to IP address management. Therefore, any changes in IP addressing may require a configuration procedure in the protocol stack on the SGSN side.

In a second addressing alternative, the first alternative is modified to transport the NSEI between the BSS and the SGSN. This covers the case in which multiple NSEIs are part of a single PCU. The application receiving the packet on the Gb' port uses the BVCI and the NSEI stored in the packet (instead of the IP address) to route it to the correct BSSGP functional entity. In addition to the advantages of the first alternative, this alternative separates the NSEI and the BVCI from the IP network addressing. NSEI and IP addresses are configured independently. The second alternative is preferred since the only disadvantage is that it increases the header size by two bytes in order to carry the NSEI.

In summary, user data PDUs are routed between the BSSGP layer in the BSS and the BSSGP layer in the SGSN utilizing BVCIs and NSEIs. Control data PDUs are routed between the NS' layer in the BSS and the NS' layer in the SGSN utilizing only NSEIs.

It is thus believed that the operation and construction of the present invention will be apparent from the foregoing description. While the interfacing system and method shown and described has been characterized as being preferred, it will be readily apparent that various changes and modifications could be made therein without departing from the scope of the invention as defined in the following claims.

What is claimed is:

1. A method in a General Packet. Radio Service (GPRS) network of interfacing a Base Station System (BSS) and a Serving GPRS Support Node (SGSN), said method comprising the steps of:
   implementing a protocol stack in the BSS and the SGSN that includes a User Datagram Protocol (UDP) layer over an Internet Protocol (IP) layer; and
   transmitting packet data units (PDUs) between the BSS and the SGSN over a connectionless IP network.

2. The method of interfacing a BSS and an SGSN of claim 1 wherein the step of transmitting PDUs between the BSS and the SGSN includes transmitting PDUs between functional entities in the BSS and functional entities in the SGSN using IP packets following multiple routes between end points over a connectionless IP network.

3. The method of interfacing a BSS and an SGSN of claim 1 wherein the step of implementing a protocol stack in the BSS and the SGSN also includes the steps of:
   implementing in the BSS and the SGSN, a Base Station System GPRS Protocol (BSSGP) protocol layer that provides radio-related, Quality-of-Service (QoS), and routing-information that is required to transmit user data PDUs between the BSS and the SGSN; and
   implementing in the BSS and the SGSN, a modified Network Services (NS') layer that maps the BSSGP layer to the UDP and IP layers, routes control data between the BSS and the SGSN, and provides access to the IP network.

4. The method of interfacing a BSS and an SGSN of claim 3 wherein the step of implementing a modified NS' layer includes reserving a single UDP port to make the NS' layer and the BSSGP layer act as an application over the IP stack.

5. The method of interfacing a BSS and an SGSN of claim 4 wherein the step of implementing a modified NS' layer includes dividing the NS' layer into an NS'-Network Service Control (NS-NSC) sub-layer and an NS'-Sub-Network Service (NS-SNS) sub-layer, said NS'-NSC sub-layer mapping to the BSSGP layer and managing functional entities therein, and said NS'-SNS sub-layer mapping to the UDP and IP layers and providing access to the IP network.

6. The method of interfacing a BSS and an SGSN of claim 3 wherein the step of transmitting PDUs between functional entities in the BSS and functional entities in the SGSN includes routing user data PDUs between the BSSGP layer in the BSS and the BSSGP layer in the SGSN utilizing BSSGP Virtual Circuit Identifiers (BVCIs) and Network Service Entity Identifiers (NSEIs).

7. The method of interfacing a BSS and an SGSN of claim 6 wherein the step of routing user data PDUs between the BSSGP layer in the BSS and the BSSGP layer in the SGSN includes creating user data PDUs that include an IP header, a UDP header, an NSEI, a BVCI, and an NS' message payload.

8. The method of interfacing a BSS and an SGSN of claim 6 wherein the step of transmitting PDUs between functional entities in the BSS and functional entities in the SGSN includes routing control data PDUs between the NS' layer in the BSS and the NS' layer in the SGSN utilizing Network Service Entity Identifiers (NSEIs).

9. The method of interfacing a BSS and an SGSN of claim 8 wherein the step of routing control data PDUs between the NS' layer in the BSS and the NS' layer in the SGSN includes creating control data PDUs that include an IP header, a UDP header, an NSEI, and an NS' message payload.

10. The method of interfacing a BSS and an SGSN of claim 3 wherein the configuration of the BSSGP layer is independent of the IP configuration and topology of the network.

11. In a General Packet Radio Service (GPRS) network, a Serving GPRS Support Node (SGSN) that interfaces with a Base Station System (BSS) utilizing a Gb-over-IP interface, said SGSN comprising:
    a protocol stack that includes a User Datagram Protocol (UDP) layer over an Internet Protocol (IP) layer; and
    means for transmitting and receiving packet data units (PDUs) to and from the BSS over a connectionless IP network.

12. The SGSN of claim 11 wherein the protocol stack includes:
    a Base Station System GPRS Protocol (BSSGP) protocol layer that provides radio-related, Quality-of-Service (QoS), and routing-information that is required to transmit user data PDUs between the SGSN and the BSS; and
    a modified Network Services (NS') layer that maps the BSSGP layer to the UDP and IP layers, routes control data between the SGSN and the BSS, and provides access to the IP network.

13. The SGSN of claim 12 wherein the modified NS' layer includes:
    an NS'-Network Service Control (NS-NSC) sub-layer that maps to the BSSGP layer and manages functional entities therein; and
    an NS'-Sub-Network Service (NS-SNS) sub-layer that maps to the UDP and IP layers and provides access to the IP network.

14. In a General Packet Radio Service (GPRS) network, a Base Station System (BSS) that interfaces with a Serving GPRS Support Node (SGSN) utilizing a Gb-over-IP interface, said BSS comprising:
    a protocol stack that includes a User Datagram Protocol (UDP) layer over an Internet Protocol (IP) layer; and
    means for transmitting and receiving packet data units (PDUs) to and from the SGSN over a connectionless IP network.

15. The BSS of claim 14 wherein the protocol stack includes:
    a Base Station System GPRS Protocol (BSSGP) protocol layer that provides radio-related, Quality-of-Service (QoS), and routing-information that is required to transmit user data PDUs between the BSS and the SGSN; and
    a modified Network Services (NS') layer that maps the BSSGP layer to the UDP and IP layers, routes control data between the BSS and the SGSN, and provides access to the IP network.

16. The BSS of claim 15 wherein the modified NS' layer includes:
    an NS'-Network Service Control (NS-NSC) sub-layer that maps to the BSSGP layer and manages functional entities therein; and
    an NS'-Sub-Network Service (NS-SNS) sub-layer that maps to the UDP and IP layers and provides access to the IP network.

17. In a General Packet Radio Service (GPRS) network, a system for interfacing a Serving GPRS Support Node (SGSN) with a Base Station System (BSS) utilizing a Gb-over-IP interface, said system comprising: SGSN comprising:
    an SGSN comprising:
        a protocol stack that includes a User Datagram Protocol (UDP) layer over an Internet Protocol (IP) layer; and
        means for transmitting and receiving packet data units (PDUs) to and from the BSS over a connectionless IP network; and
    a BSS comprising:
        a protocol stack that includes a UDP layer over an IP layer; and
        means for transmitting and receiving PDUs to and from the SGSN over a connectionless IP network.

18. The system of claim 17 wherein the protocol stacks in the SGSN and the BSS include:
    a Base Station System GPRS Protocol (BSSGP) protocol layer that provides radio-related, Quality-of-Service (QoS), and routing-information that is required to transmit user data PDUs between the SGSN and the BSS; and
    a modified Network Services (NS') layer that maps the BSSGP layer to the UDP and IP layers, routes control data between the SGSN and the BSS, and provides access to the IP network.

19. The system of claim 18 wherein the modified NS' layer includes:
    an NS'-Network Service Control (NS-NSC) sub-layer that maps to the BSSGP layer and manages functional entities therein; and
    an NS'-Sub-Network Service (NS-SNS) sub-layer that maps to the UDP and IP layers and provides access to the IP network.

20. The system of claim 19 wherein the means within the SGSN for transmitting and receiving PDUs to and from the BSS, and the means within the BSS for transmitting and receiving PDUs to and from the SGSN include BSSGP Virtual Circuit Identifiers (BVCIs) and Network Service Entity Identifiers (NSEIs) for routing user data PDUs between the BSSGP layer in the BSS and the BSSGP layer in the SGSN.

21. The system of claim 19 wherein the means within the SGSN for transmitting and receiving PDUs to and from the BSS, and the means within the BSS for transmitting and receiving PDUs to and from the SGSN include Network Service Entity Identifiers (NSEIs) for routing control data PDUs between the NS' layer in the SGSN and the NS' layer in the BSS.

* * * * *